(No Model.)
E. WRIGHT.
MECHANICAL MOVEMENT.
No. 425,844. Patented Apr. 15, 1890.
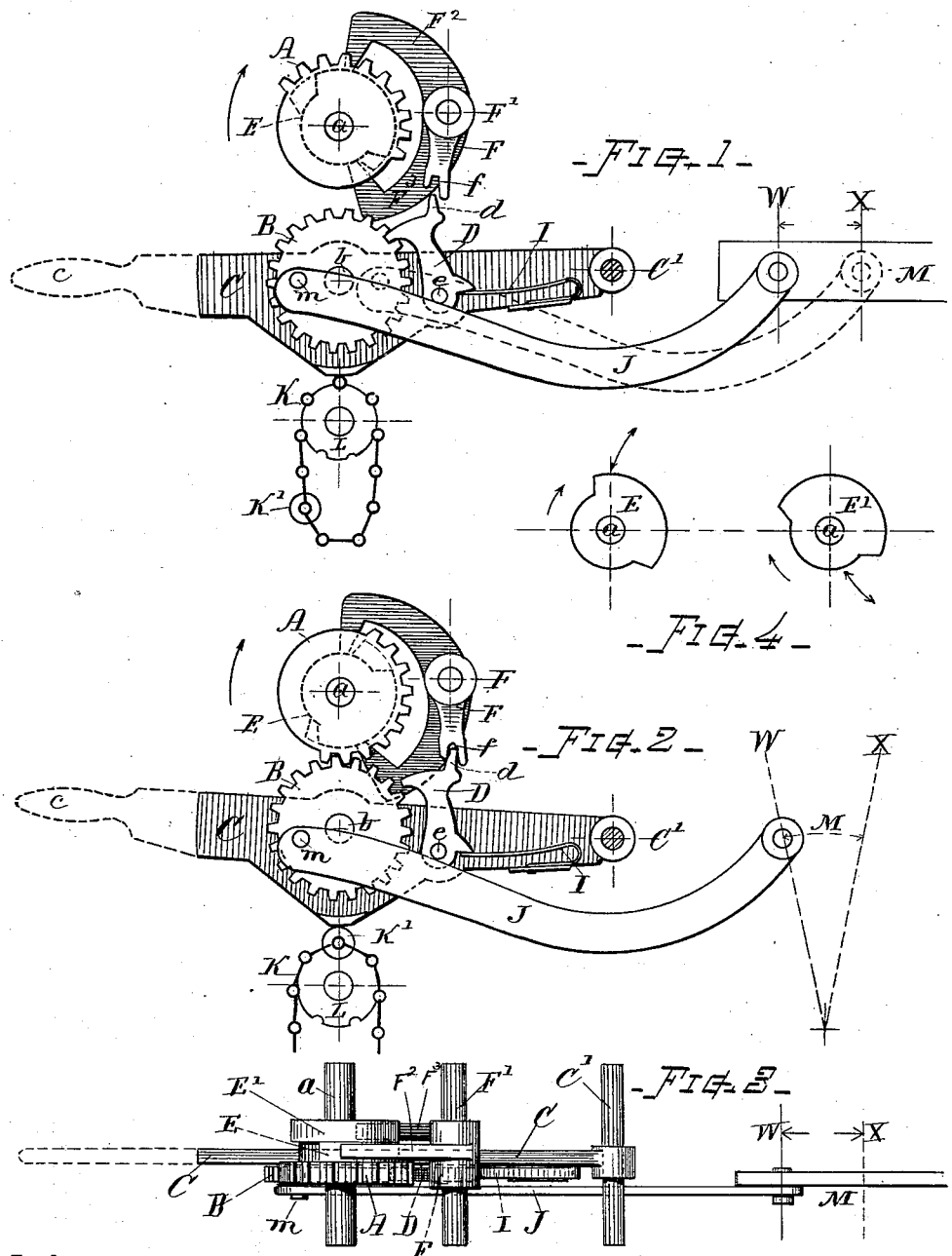
Witnesses
Ella P. Blenus.
Simeon E. King
Inventor
Edward Wright
By Chas. H. Burleigh
Attorney

UNITED STATES PATENT OFFICE.

EDWARD WRIGHT, OF WORCESTER, ASSIGNOR TO THE DAVIS & FURBER MACHINE COMPANY, OF NORTH ANDOVER, MASSACHUSETTS.

MECHANICAL MOVEMENT.

SPECIFICATION forming part of Letters Patent No. 425,844, dated April 15, 1890.

Application filed September 26, 1889. Serial No. 325,188. (No model.)

*To all whom it may concern:*

Be it known that I, EDWARD WRIGHT, a citizen of the United States, residing at Worcester, in the county of Worcester and State of Massachusetts, have invented certain new and useful Improvements in Mechanical Movements, of which the following, together with the accompanying drawings, is a specification sufficiently full, clear, and exact to enable persons skilled in the art to which this invention appertains to make and use the same.

The prime object of my present invention is to provide an efficient and practical means for converting from a continuous rotary motion to a reciprocatory motion active at regular or irregular intervals of time.

Another object is to afford, in combination with a driving-gear and an operated gear that is thrown into and out of mesh therewith, means for maintaining the proper relation of the gears, one with the other, for accurately intermeshing, and means for automatically locking said operated gear when thrown out of engagement and for unlocking the same when thrown into engagement with its driving-gear.

These objects I attain by mechanism the nature, construction, and operation of which is illustrated and explained in the following description, the particular subject-matter claimed being hereinafter definitely specified.

Figure 1 is a side view of my improved mechanical movement shown with the gears out of mesh. Fig. 2 is a similar view shown with the gears in mesh. Fig. 3 is a top plan view. Fig. 4 shows the form of cams for actuating the rocker at positions relatively as in Fig. 1.

This invention is applicable for employment as a mechanical movement in shedding mechanism and drop-box motions for looms; also, for moving at any designated interval clutches or shippers for bringing into action and stopping different parts of machines; also, for working signals or giving impulses or operations in accordance with any prearranged system and synchronic order.

Referring to parts, A denotes a toothed wheel or gear, which serves as the driver, and which in the present instance has teeth on a part of its periphery, while the other part thereof is without teeth. Said gear is mounted on an axis $a$, that runs at stationary position by a continuous rotary movement.

B indicates a toothed wheel or spur-gear mounted on an axis-stud $b$, that is supported on a movable part or vibrating arm C, whereby said gear can be moved into and out of engagement with the drive-gear A. The part C is preferably fulcrumed to swing on a stationary pivot or support at C', while its opposite end is free to be elevated and depressed by any suitable means, or by hand, if in any instance desired.

D indicates a locking detent or dog pivoted on the arm C, as at $e$, and normally engaging with the gear B to prevent rotation thereof. A spring I is provided for pressing forward the dog D and retaining it normally in engagement with the gear B.

F indicates a retracting rocker or vibrating part mounted on an axis at F', and provided with a recess $f$, that engages with a lug $d$ on the dog D, or vice versa, for moving said dog and unlocking the gear B when the part C is elevated or approaches the drive-gear A, but which moves backward and forward above the top of the dog without engaging when the part C is not depressed. Said rocker is operated synchronously with the revolutions of the drive-gear A, and is best actuated by means of a cam or cams E E', combined with the shaft or axis $a$ of the gear A, which cams engage with an arm or arms $F^2$ $F^3$, fixed to the retractor-axis F'.

J indicates a link or connecting-rod, one end of which is connected with a crank, pivot, or wrist pin $m$, fixed in the wheel B, while its opposite end is suitably joined with the lever, bar, or other mechanical part M, to which the movement and power are to be transmitted, and which may be a part of any mechanism desired.

K indicates a pattern surface or chain provided with one or more indicators K', carried by a rotatable drum L or other suitable support, and arranged to be advanced beneath the arm C by a continuous or step-by-step movement, and at given intervals engage with and lift said arm C for throwing the gear B into engagement with the gear A, which effects a half-revolution of said gear and a resultant action of the parts connected therewith.

Rotary motion can be imparted to the drive-gear and to the shaft of the chain-carrier by any suitable means, such as commonly employed for transmitting power and motion to machinery, and said parts may both be operated from the same source or from different sources, according to the requirements of the particular machine wherein this mechanical movement is employed.

In the operation, the drive-gear A being revolved in the direction indicated, the rocker is swung backward and forward by the cams E E' synchronously with the revolutions of said gear. The movable part C being then lifted by the indicator K' on the chain K, (or otherwise,) the gear B is brought into mesh with the drive-gear A, which, being partially toothed, effects a semi-rotation of the gear B and its crank, causing a movement of the mechanism at its connecting-point at M from the position W to the position X. The cams E and E' are shaped and adjusted in such manner that when the groove $f$ of the rocker F engages the lug on the dog as the part C is elevated they will cause said rocker to move backward, carrying said dog and retracting its detent from the gear B just at the instant that the teeth of gear B strike into mesh with gear A, and will again move forward to cause the detent to engage with the gear B just at the instant the gears come out of mesh with each other, thus locking the gear B from rotating when out of engagement, and also maintaining the proper relation between the gears A and B, so that their teeth will accurately intermatch whenever the operated gear B is brought into conjunction with the drive-gear A. When the arm C and gear B are again elevated, or if held in continued elevation, the subsequent revolution of the gear A effects a second half-revolution of the gear B and crank and causes the return movement of mechanism M from the position X to the position W, and so on, repeating the movements whenever the part C is elevated, which may be at any regular or irregular intervals, according to the length of the chain K and the arrangement of indicators therein.

The frame for supporting the axes of the several parts is not herein shown, as it will be understood that such frame can be of any suitable construction.

What I claim as my invention, to be herein secured by Letters Patent, is—

1. The mechanism for converting motion herein described, consisting of a revoluble drive-gear, a rotatable gear carrying a crank-pin, a movable support for said crank-gear, whereby it is moved into and out of mesh with said drive-gear, the locking detent or dog pivoted upon said support to swing into and out of engagement with the crank-gear, a spring that presses said detent toward said crank-gear, a retractor having backward and forward movement synchronously with the rotation of the drive-gear adapted to engage with said locking-dog by intermatching lugs normally out of reach when said support is depressed, but engaging for throwing back said detent to release said crank-gear when said support is elevated, and a connecting-link from said crank-pin to the operated mechanism, said parts being combined and organized for operation substantially as set forth.

2. The combination, substantially as described, of the drive-gear A, the movable arm C, the rotatable gear B, axially supported on said arm and carrying a crank-pin $m$, the locking-detent pivoted on the arm and engaging a recess in the gear B, the rocking retractor fitted for engagement with said locking-detent, means for actuating said retractor in unison with the revolutions of the drive-gear, and a traveling pattern or chain having an indicator or indicators that lifts said arm according to the order of their arrangement, and a connection from said rotatable gear B for working the operated mechanism.

Witness my hand this 21st day of September, A. D. 1889.

EDWARD WRIGHT.

Witnesses:
CHAS. H. BURLEIGH,
ELLA P. BLENUS.